United States Patent
Devaux et al.

(10) Patent No.: US 10,324,870 B2
(45) Date of Patent: Jun. 18, 2019

(54) MEMORY CIRCUIT WITH INTEGRATED PROCESSOR

(71) Applicant: UPMEM, Grenoble (FR)

(72) Inventors: Fabrice Devaux, La Conversion (CH); Jean-François Roy, Grenoble (FR)

(73) Assignee: UPMEM, Grenoble (FR)

( * ) Notice: Subject to any disclaimer, the term of this patent is extended or adjusted under 35 U.S.C. 154(b) by 0 days.

(21) Appl. No.: 15/551,418

(22) PCT Filed: Feb. 12, 2016

(86) PCT No.: PCT/FR2016/050327
§ 371 (c)(1),
(2) Date: Aug. 16, 2017

(87) PCT Pub. No.: WO2016/132052
PCT Pub. Date: Aug. 25, 2016

(65) Prior Publication Data
US 2018/0039586 A1    Feb. 8, 2018

(30) Foreign Application Priority Data

Feb. 18, 2015  (FR) ..................... 15 51343

(51) Int. Cl.
*G06F 13/36*   (2006.01)
*G06F 13/16*   (2006.01)

(52) U.S. Cl.
CPC ...... *G06F 13/1673* (2013.01); *G06F 13/1636* (2013.01)

(58) Field of Classification Search
CPC .......................... G06F 13/1673; G06F 13/1636
See application file for complete search history.

(56) References Cited

U.S. PATENT DOCUMENTS

| | | | | |
|---|---|---|---|---|
| 5,666,485 A | * | 9/1997 | Suresh | G06F 13/1605 710/113 |
| 6,463,001 B1 | | 10/2002 | Williams | |
| 7,349,277 B2 | * | 3/2008 | Kinsley | G11C 11/406 365/193 |
| 8,438,358 B1 | * | 5/2013 | Kraipak | G11C 7/04 711/167 |

(Continued)

FOREIGN PATENT DOCUMENTS

| | | |
|---|---|---|
| EP | 0780768 A1 | 6/1997 |
| JP | H03109661 A | 5/1991 |
| WO | 2010/141221 A1 | 12/2010 |

OTHER PUBLICATIONS

International Search Report for PCT/FR2016/050327 dated Mar. 31, 2016.

*Primary Examiner* — Jing-Yih Shyu
(74) *Attorney, Agent, or Firm* — Bachman & LaPointe, P.C.

(57) ABSTRACT

A memory circuit having: a memory array including one or more memory banks; a first processor; and a processor control interface for receiving data processing commands directed to the first processor from a central processor, the processor control interface being adapted to indicate to the central processor when the first processor has finished accessing one or more of the memory banks of the memory array, these memory banks becoming accessible to the central processor.

12 Claims, 4 Drawing Sheets

(56) References Cited

U.S. PATENT DOCUMENTS

| | | | |
|---|---|---|---|
| 8,738,837 B2* | 5/2014 | Walker | G06F 12/0215 |
| | | | 711/101 |
| 9,164,698 B2* | 10/2015 | Walker | G11C 7/10 |
| 2002/0056022 A1* | 5/2002 | Leung | G06F 12/0893 |
| | | | 711/106 |
| 2005/0041500 A1* | 2/2005 | Lee | G11C 11/406 |
| | | | 365/222 |
| 2005/0071543 A1* | 3/2005 | Ellis | G06F 13/1636 |
| | | | 711/106 |
| 2010/0312990 A1* | 12/2010 | Walker | G06F 13/1663 |
| | | | 712/29 |
| 2013/0262791 A1* | 10/2013 | Henderson | G06F 1/324 |
| | | | 711/154 |
| 2015/0134897 A1* | 5/2015 | Sriramagiri | G11C 11/406 |
| | | | 711/106 |
| 2015/0221358 A1* | 8/2015 | Brandl | G11C 11/4087 |
| | | | 365/222 |

\* cited by examiner

MEMORY CIRCUIT WITH INTEGRATED PROCESSOR

BACKGROUND

The present disclosure relates to the field of DRAM (dynamic random access memory) circuits with integrated processors, and methods of communication with such memories.

Modern computers generally comprise a processing circuit, often implemented as a system on chip (SoC), coupled to one or more dynamic random access memory (DRAM) circuits. Such memories, which generally require a periodic refresh operation, are dense and relatively fast to access, and are thus used as the main RAM data storage in most computers. However, in view of the ever increasing amounts of data to be transferred between the SoC and DRAM circuits, such data transfers tend to slow the operation of the computer and lead to a relatively high energy consumption.

A solution that has been proposed is to provide DRAM circuits having one or more processors integrated therein, in addition to the processors in the SoC. Such a solution reduces the level of data transfer between the DRAM circuit and the SoC by allowing certain processing tasks to be delegated to the DRAM processors, so that these processing tasks can be performed while avoiding data transfer between the DRAM circuit and the SoC.

However, a challenge in providing a DRAM circuit with integrated processors is that the interface with the SoC is time consuming and costly to implement.

International patent application published as WO2010/141221 describes a system and method for arbitrating access to a memory array associated with an internal processor. The arbitration involves interfacing an external processor, comprising a memory controller, with the internal processor through a control interface formed of electrical connections for communicating request and grant signals.

A problem in systems such as the one described in the publication WO2010/141221 is that the external processor incorporating the memory controller must be modified in order to permit the arbitration control signals to be communicated to and from the internal processor, leading to a solution that is costly and complex.

SUMMARY

It is an aim of embodiments of the present disclosure to at least partially address one or more problems in the prior art.

According to one aspect, there is provided a memory circuit comprising a memory array comprising one or more memory banks; a first processor; and a processor control interface for receiving data processing commands directed to the first processor from a central processor, the processor control interface being adapted to indicate to the central processor when the first processor has finished accessing one or more of the memory banks of the memory array, these memory banks becoming accessible to the central processor.

According to one embodiment, the memory circuit is a dynamic random access memory (DRAM) circuit further comprising a refresh control circuit adapted: to receive, from the central processor, refresh transactions for performing data refresh operations in at least one memory bank of the memory array; to determine whether the at least one memory bank is being accessed by the first processor, and if so, to delay the start time of the data refresh operation.

According to one embodiment, the refresh control circuit comprises a refresh pending register, and delaying the start time of the data refresh operation comprises indicating in the refresh pending register that the refresh operation is pending.

According to one embodiment, the processor control interface comprises a set of control registers accessible within an address space of the memory circuit.

According to one embodiment, the address space of the memory circuit comprises one or more addresses permanently associated with the set of control registers.

According to one embodiment, the address space of the memory circuit comprises one or more addresses associated with the set of control registers, and the one or more addresses are adapted to be transformed to addresses of the memory array upon assertion of a register deactivation control signal.

According to one embodiment, the memory circuit is adapted to receive an activation signal from the central processor for rendering the set of control registers accessible within the address space of the memory circuit.

According to one embodiment, the activation signal is provided via an address bus, and is detectable by the processor control interface.

According to one embodiment, the memory access sequence for rendering the set of control registers accessible is a burst access sequence in which not all of the words are written.

According to one embodiment, the memory access sequence for rendering the set of control registers accessible is a plurality of memory accesses to memory cells within a memory zone in one of said memory banks within a first time period.

According to one embodiment, the memory circuit is adapted to detect the memory access sequence based on one or more of: a time period in which the memory access sequence is received; and a time duration of the memory access sequence.

According to a further aspect, there is provided a system comprising: a plurality of memory circuits; and a central processor coupled to each of the memory circuits via a common N-bit data bus, each memory circuit comprising an N-bit bus interface coupled to the N-bit data bus.

According to a further aspect, there is provided a method of accessing a memory circuit comprising a memory array having one or more memory banks; a first processor; and a processor control interface, the method comprising: receiving, by the processor control interface, data processing commands directed to the first processor from a central processor; indicating, by the processor control interface to the central processor, when the first processor has finished accessing one or more of the memory banks of the memory array, these memory banks becoming accessible to the central processor.

According to one embodiment, the memory circuit is a dynamic random access memory (DRAM) circuit, the method further comprising: receiving, by a refresh control circuit, a refresh transaction for performing a data refresh operation in a memory bank of the memory array; determining, by the refresh control circuit, whether the memory bank is being accessed by the first processor, and if so, delaying the start time of the data refresh operation.

According to one embodiment, the processor control interface comprises a set of control registers, the method further comprising: receiving by the processor control interface an activation signal from the central processor for rendering the set of control registers accessible within an address space of the memory circuit.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

The present disclosure describes embodiments of a memory circuit comprising an integrated processor according to an example in which the memory circuit is a DRAM circuit. While not represented in the figures, it will be understood by those skilled in the art that a DRAM circuit is a memory device in which data is stored by an array of memory cells, each memory cell comprising a capacitor for storing a voltage level representative of a data bit, and a switch for controlling access to the memory cell. However, the principles described herein could be readily applied to other types of memory circuits, which may or may not require a refresh operation. An advantage of embodiments described herein is that the integration of one or more processors in the memory circuit does not prevent a legacy memory interface, having no provision for communication with such an integrated processor, from being used to communicate with the memory circuit.

Figure 1:
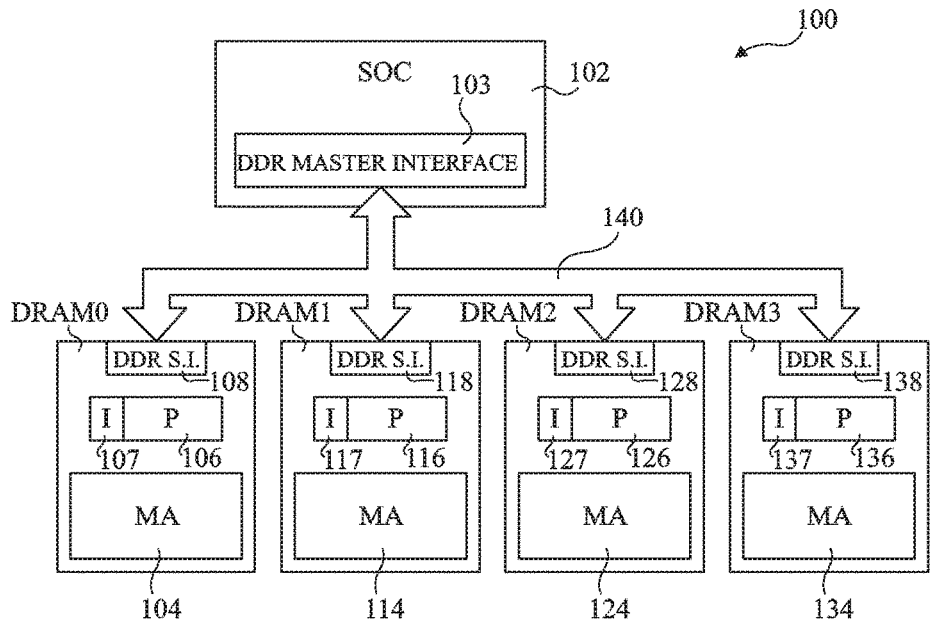
FIG. 1 schematically illustrates a computing system comprising DRAM circuits having integrated processors according to an example embodiment.

FIG. 1 schematically illustrates a computing system 100 according to an example embodiment. The computing system 100 comprises a central processing device 102, implemented in this example as a system on chip (SoC), comprising one or more processors (not illustrated) and a DDR master interface (DDR MASTER INTERFACE) 103 for communicating with a number of DRAM circuits.

In the example of FIG. 1 there are four DRAM circuits labelled DRAM0 to DRAM3, but in alternative embodiments there could be any number of DRAM circuits.

The DRAM circuit DRAM0 comprises a DRAM memory array (MA) 104 and one or more internal processors (P) 106, which will be referred to as hereafter as DRAM processors. The DRAM circuit DRAM0 also for example comprises a DRAM processor control interface (I) 107 associated with each DRAM processor, permitting one or more processors in the SoC 102 to communicate with and control the corresponding processors 106. A DDR slave interface 108 is for example provided in the DRAM circuit DRAM0 for communications with the DDR master interface 103.

Similarly, the DRAM circuits DRAM1, DRAM2 and DRAM3 respectively comprise DRAM memory arrays 114, 124, 134 and one or more internal processors (P) 116, 126, 136. The DRAM circuits DRAM1, DRAM2, DRAM3 also for example respectively comprise DRAM processor control interfaces 117, 127, 137 permitting one or more processors in the SoC 102 to control the processors 116, 126, 136 respectively. DDR slave interfaces 118, 128, 138 are for example provided in the circuits DRAM1, DRAM2, DRAM3 for communications with the DDR master interface 103.

The communications between the DDR master interface 103 and each of the slave interfaces 108, 118, 128, 138 is for example via a bus link 140 comprising an address bus, a data bus, and in some cases one or more further control lines (not illustrated in FIG. 1). Communications with the DRAM circuits DRAM0 to DRAMS over the bus link 140 for example respect one of the DDR protocols.

The term "DDR protocol" is used herein to designate any of the following protocols: DDR1, DDR2, DDR3, DDR4, RLDRAM (reduced latency random access memory), RLDRAM2, and any protocol that is similar to these protocols.

Figure 2:
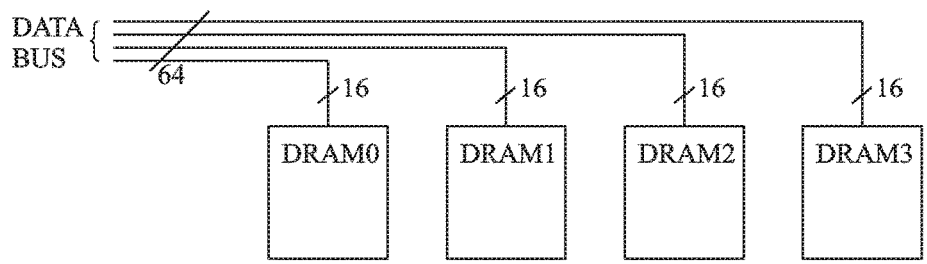
FIG. 2 schematically illustrates a DRAM data bus according to one example.

FIG. 2 schematically illustrates a 64-bit wide data bus (DATA BUS) for connecting a SoC (not illustrated) to the four DRAM circuits DRAM0 to DRAM. It can be seen that the data bus is split such that each circuit DRAM0 to DRAM3 receives 16 bits of the 64-bit wide data bus. For example, the DRAM0 circuit receives the bits 0 to 15, and contains the bytes 0,1,8,9,16,17, etc., the DRAM1 circuit receives the bits 16 to 31, and contains the bytes 2,3,10,11, 18,19, etc., the DRAM2 circuit receives the bits 32 to 47, and contains the bytes 4,5,12,13,20,21, etc., and the DRAM3 circuit receives the bits 48 to 63, and contains the bytes 6,7,14,15,22,23, etc. An advantage of such an arrangement is that separately addressing the individual DRAM circuits is not necessary. However, when a processor is integrated within each DRAM circuit, a drawback with providing the data bus arrangement of FIG. 2 is that each DRAM circuit stores discontinuous data, leading to a high complexity for performing any processing of this data under control of the SoC processors.

Figure 3:
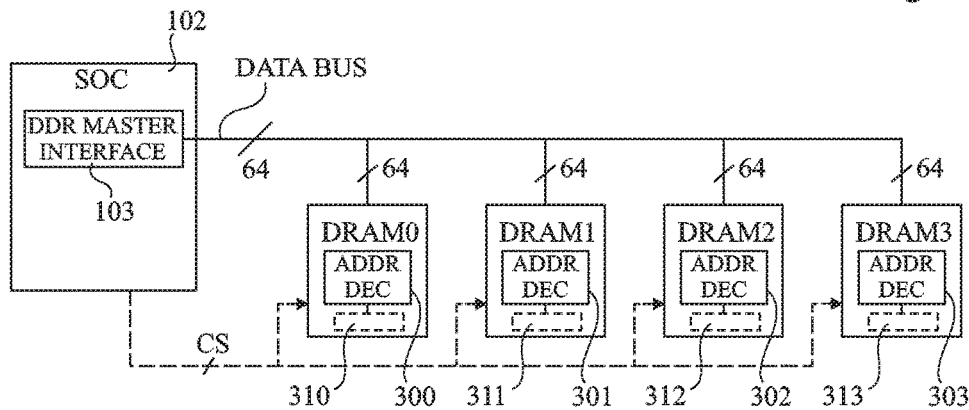
FIG. 3 schematically illustrates a DRAM data bus according to an embodiment of the present disclosure.

FIG. 3 schematically illustrates a 64-bit wide data bus (DATA BUS) for connecting a SoC (again not illustrated) to the four DRAM circuits DRAM0 to DRAM3. In this example, each DRAM circuit comprises a 64-bit bus interface coupled to the 64-bit data bus, and thus each DRAM circuit receives all of the bits transmitted on the data bus. Thus each DRAM circuit contains a continuous portion of the total memory. More generally, assuming that the data bus of the SoC is N-bits, wherein N is an integer equal to or greater than 2, each of the DRAM circuits also has an N-bit data bus.

A mechanism is also for example provided allowing the SoC to select the DRAM circuit for each DRAM memory access.

In one embodiment, the SoC, or an additional address decoding circuit, is capable of providing a chip select signal CS on an output line. As shown by a dashed line CS in FIG. 3, the signal CS is for example provided to each DRAM circuit in order to select one of these DRAM circuits for a given memory access. In the case that there are four DRAM circuits, the signal CS is for example a 2-bit signal, the values "00", "01", "10" and "11" being associated with the DRAM circuits DRAM0, DRAM1, DRAM2 and DRAM3 respectively. If there is a different number of DRAM circuits, the signal CS may comprise a different number of bits.

In another embodiment, the SoC, or an additional address decoding circuit, is capable of providing a dedicated chip select signal CS to each DRAM circuit. In this case, the dashed line CS is a 4-bit wide bus comprising a dedicated signal CS[0] provided to the DRAM0 circuit, a dedicated signal CS[1] provided to the DRAM1 circuit, a dedicated signal CS[2] provided to the DRAM2 circuit, and a dedicated signal CS[3] provided to the DRAM circuit.

In an alternative embodiment, each of the DRAM circuits is adapted to decode a different address range of the total address range. For this, the address decoders 300 to 303 of the DRAM circuits DRAM0 to DRAM respectively have for example circuits each adapted to decode the corresponding address range. However, such a solution has the drawback that it adds complexity to the manufacturing processes as the DRAM circuits are no longer identical to each other.

An alternative solution is to provide a set of fuses associated with each address decoder 300 to 303 and represented by dashed rectangles 310 to 313 respectively. The fuses are for example of the type programmed by laser, by a voltage applied across them, or by a current passed through them, and they are programmed after manufacture of the DRAM circuits so that each DRAM circuit is configured to decode a specific address range.

As yet a further alternative solution, the address range accepted by each DRAM circuit could be electrically configured by input signals provided to input pins of the DRAM circuits directly after a reset operation or after power up of the circuits. The input pins could be dedicated pins provided for this specific purpose, or the standard input/output pins of the DRAM circuit could be used during the configuration phase to allow the address ranges to be defined.

It will be noted that the data bus of FIG. 3 in which each date line is coupled to more than one of the DRAM circuits is likely to result in an increased electrical capacitance of the data lines. To cope with this, a buffer circuit could be added on each data line. This is likely to increase the latency of a memory access by one cycle or more, but would lead to a relatively insignificant percentage increase in the overall latency. Additionally or alternatively, if the DRAM circuits are mounted in a memory module conforming to one of the DIMM (dual in-line memory module) standards, it will be apparent to those skilled in the art how the additional line capacitance and/or the addition of buffer circuits could be masked by such a DIMM memory module.

Figure 4:
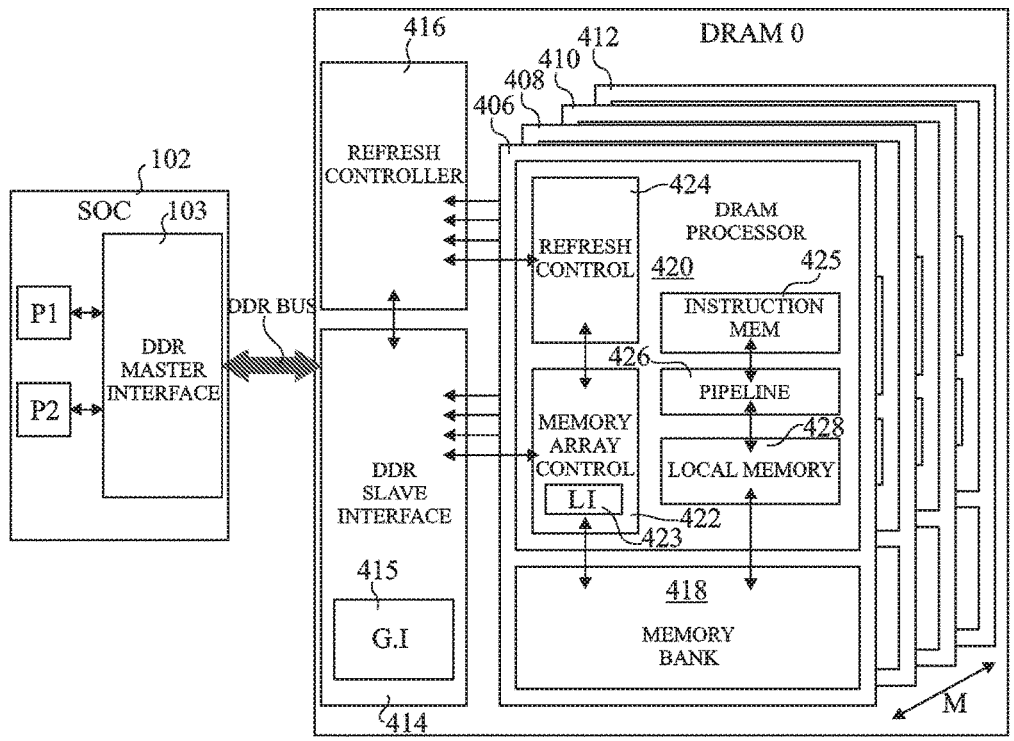
FIG. 4 schematically illustrates part of the computing system of FIG. 1 in more detail according to an example embodiment.

FIG. 4 schematically illustrates the SoC 102 and the DRAM circuit DRAM0 in more detail. The other DRAM circuits DRAM1 to DRAM for example comprise similar structures.

The SoC 102 for example comprises processors P1 and P2, each capable of accessing the DRAM circuit DRAM0. The processors P1, P2 are for example each under the control of instructions stored in corresponding instruction memories (not illustrated in FIG. 4). While there are two processors in the SoC in the example of FIG. 4, in alternative embodiments there could be any number of processors.

The DRAM circuit DRAM0 for example comprises a plurality of sub-memories 406, 408, 410 and 412, and a common DDR slave interface (DDR SLAVE INTERFACE) 414, comprising a global DRAM processor control interface (GI) 415 of the DRAM circuit, and a common refresh controller (REFRESH CONTROLLER) 416 coupled to each of the sub-memories. While in the example of FIG. 4 there are four sub-memories, there could be any number M of sub-memories.

The sub-memory 406 is illustrated in detail, and the other sub-memories for example comprise the same elements. The sub-memory 406 for example comprises a memory bank (MEMORY BANK) 418 forming a sub-portion of the memory array of the DRAM circuit DRAM0. The sub-memory 406 also for example comprises a processor (DRAM PROCESSOR) 420 coupled to the memory bank 418, comprising a memory bank control circuit (MEMORY ARRAY CONTROL) 422 comprising a local DRAM processor control interface (LI) 423, a refresh control circuit (REFRESH CONTROL) 424, an instruction memory 425, a processing pipeline (PIPELINE) 426, and local memory (LOCAL MEMORY) 428 of the processor.

In the embodiment of FIG. 4 the DRAM processor control interface of the DRAM0 circuit is implemented by the global interface 415, and by a local interface 423 in each of the sub-memories. However, in alternative embodiments, the DRAM processor control interface could be implemented by only the global interface 415, or by only a local interface 423 in each sub-memory.

As will be described in more detail below, the refresh control circuit 424 permits a control of refresh transactions received by a sub-memory while a data processing operation is under way by one of the DRAM processors.

The memory bank control circuit 422 for example provides multiplexing between DDR memory requests destined for that bank and DRAM processor requests.

The processing pipeline 426 for example comprises data processing elements that operate under the control of instructions stored in the instruction memory 425. Given that the DRAM processors have a complementary role with respect to the SoC processors, they for example use a different instruction set. For example, the DRAM processors use a reduced instruction set compared to the one used by the SoC processors. For example, in some embodiments, one or more instructions to be executed by the DRAM processors are written by a SoC processor directly into the DRAM processor instruction memory 425 through the global interface 415 and/or the local interface 423. Alternatively or additionally, one or more instructions to be executed by the DRAM processors are written by a SoC processor directly into the memory bank 418, and the SoC processor may then instruct the DRAM processor to load the instructions from the memory bank 418 into its instruction memory 425.

The local memory 428 for example stores data, temporarily or otherwise, used by the processing pipeline 426 when performing operations on the data held in the memory bank 418.

While not illustrated in FIG. 4, there may be one or more further intermediate circuits between the SoC and the DRAM circuits. For example, in the case that the DRAM circuits are mounted according to the so-called fully registered or fully buffered DIMM standards, an advanced memory buffer (AMB) may be provided, allowing additional complex processing functions.

Figure 5:
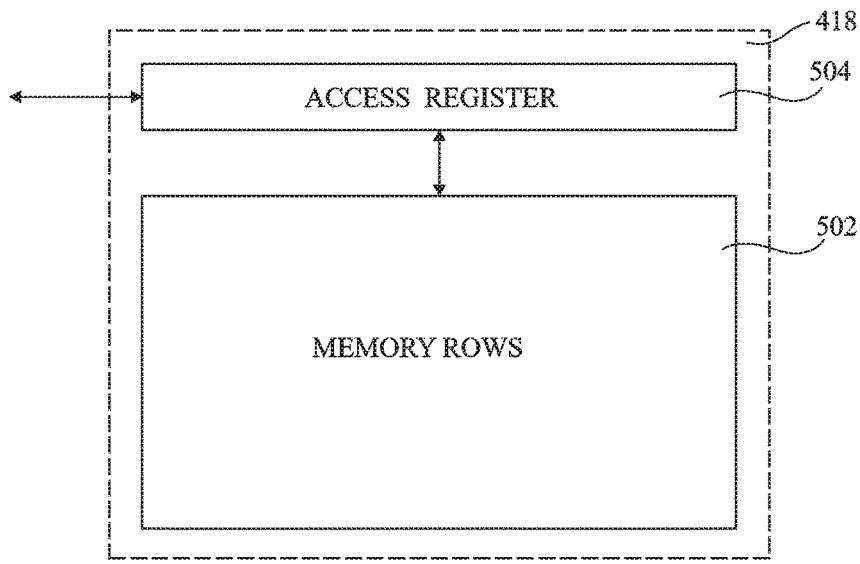
FIG. 5 schematically illustrates a memory bank of FIG. 4 in more detail according to an example embodiment.

FIG. 5 schematically illustrates the memory bank 418 of FIG. 4 in more detail according to an example embodiment. As illustrated, the memory bank 418 for example comprises a block of DRAM memory rows (MEMORY ROWS) 502, and an access register (ACCESS REGISTER) 504.

During a read operation at an address in the memory bank 418 of the DRAM circuit DRAM0, the memory bank 418 is selected by part of the address. The row to be read of the memory bank 418 is then identified based on the address, and the data of the row is loaded into the access register 504. One or more words forming this row can then be read out of the access register 504 and provided to either a processor of the SoC 102, or to the local memory 428 of the DRAM processor 420 in the case that an internal processing operation is to be performed.

During a write operation at an address in the memory bank 418 of the DRAM circuit DRAM0, the memory bank 418 is selected by part of the address. The row to be written of the memory bank 418 is then identified based on the address, and loaded into the access register 504. One or more words forming this row can then be written to the access register by a processor of the SoC 102, or to the local memory 428 of the DRAM processor 420 in the case that an internal processing operation is to be performed. When the access register 504 is to be reused for accessing another row of the memory bank 502 or if a refresh operation is to be performed, the contents of the access register 504 is re-written to the corresponding row of the memory bank 418.

It should be noted that transfer operations of rows of data from the memory rows 502 to the access register 504 or from the access register 504 to the memory rows 502 of the memory bank are relatively slow operation performed over several clock cycles and which should not be interrupted once they have been started.

Furthermore, it is not possible for the SoC processors P1, P2 and/or internal DRAM processor to access, in a finely interlaced manner, a same memory bank of a DRAM circuit. For example, the following scenario illustrates this:
  a DRAM processor starts to load the access register of a memory bank with one of the rows of that memory bank, this operation taking several cycles; and
  before the end of the loading operation, one of the SoC processors requests that another row of the memory bank is loaded into the same access register, the SoC processor expecting this load operation to be completed within a set number of cycles.

This creates a potential problem because DDR protocols do not permit a request from a SoC processor to be ignored or delayed, and nor does the bank circuitry permit a load operation within a memory bank to be cancelled part way through. Furthermore, the DDR protocols do not define any mechanism for permitting a DRAM circuit to inform the SoC processor accessing it:
  that it is unable to process the memory access request straight away;
  that requested data will not be available immediately; or
  of the time at which the requested data will become available.

Therefore, in the case highlighted above, the SoC processor is likely to consider that, after the set number of cycles associated with the load operation, the access register contains the requested data, whereas in fact it does not.

This problem is addressed at least partially by defining an access protocol for use by the SoC processors and the DRAM processors that is also compatible with a DDR protocol, as will now be described in more detail with reference to FIG. 6.

Figure 6:
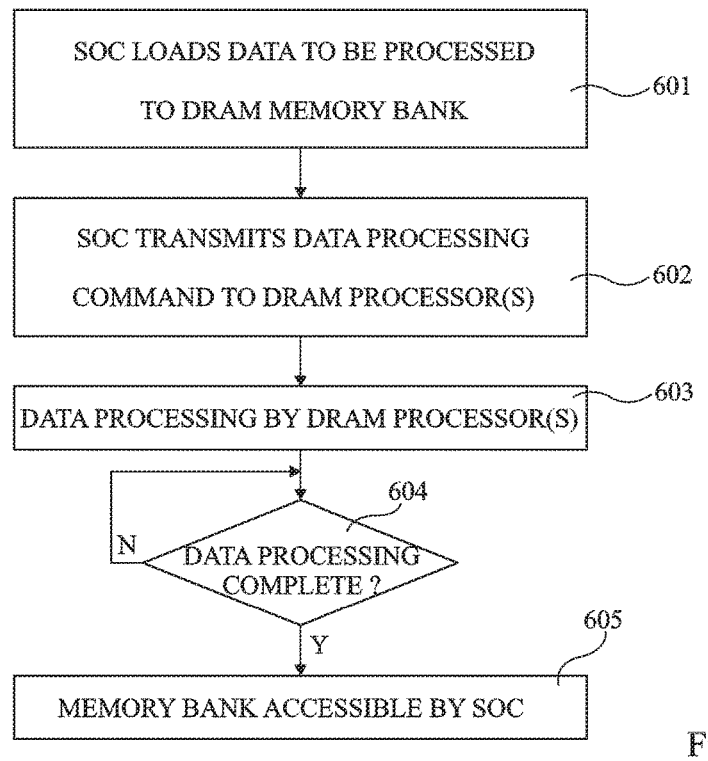
FIG. 6 is a flow diagram representing operations in a method of delegating a processing task to a DRAM processor according to an example embodiment.

FIG. 6 is a flow diagram illustrating operations in a method of accessing a DRAM circuit according to an embodiment of the present disclosure.

In an operation 601, one or more processors of the SoC load data to be processed by one or more DRAM processors into a corresponding memory bank of the DRAM circuit. For example, if the DRAM processor 420 of the sub-memory 406 of FIG. 4 is to perform the processing operation, the data is for example loaded into the memory bank 418.

In an operation 602, one or more of the SoC processors use the DRAM processor control interface of the DRAM circuit to indicate to the one or more DRAM processors that they may begin processing the data.

In an operation 603, the data processing by the DRAM processors is performed, and during this processing, the software executed by the processors of the SoC does not access the corresponding memory bank. In the case that one of the SoC processors does attempt to access a memory bank while one of the DRAM processors is processing data in that memory bank, an indefinite response is for example provided, and in some embodiments an error flag can be set in a register of the DRAM processor control interface to indicate that this error occurred, and to facilitate debugging.

In some embodiments, each DRAM processor is dedicated to a given memory bank within its sub-memory. Alternatively, in some cases, more than one DRAM processor may be capable of accessing the same memory bank. In such cases, an arbitration procedure may be implemented between the DRAM processors in order to permit the DRAM processors to correctly access the memory bank. Those skilled in the art will realise that such an arbitration procedure is not constrained by the DDR interface used for communications with the SoC, and therefore any appropriate arbitration procedure may be implemented.

In a subsequent operation 604, it is determined when the data processing by the DRAM processor is complete. When completed, the next operation is 605, in which the memory bank becomes accessible by the SoC processors. For example, the DRAM processor control interface is used to inform the software executed by the SoC processors that the DRAM processors have finished processing the data in the memory bank. For example, the DRAM processor control interface includes a register accessible by the SoC processors and including a status bit indicating whether or not the DRAM processors have finished their task, or at least the portion of the task for which they needed to access the memory bank. When the DRAM processors have finished processing the data in the memory bank and have released it so that it becomes accessible again by the SoC processors, the DRAM processors are for example configured not to access the memory bank again until instructed by the SoC processors to perform another processing operation.

In some cases, it may be permitted for the SoC processors to stop, part way through, the processing by a DRAM processor in order to rapidly access the data stored in the memory bank concerned. For example, this might be appropriate in the case of a high priority task to be performed by a SoC processor. This is for example achieved by asserting a stop command via the DRAM processor control interface. For example, after receiving a stop command, the DRAM processor takes several cycles to complete one or more current access operations, and informs the SoC processor, via the DRAM processor control interface, when the memory bank is ready to be accessed.

An advantage of the DRAM memory access method as described in relation to FIG. 6 is that it ensures that the DRAM processors are never in competition with the SoC processors. Furthermore, the SoC processors are able to access the memory banks of the DRAM circuits in the normal deterministic fashion in accordance with DDR-type protocols.

Of course, the SoC processors will be denied access to certain memory banks while the DRAM processors are processing data. However, as there are likely to be several memory banks in each DRAM circuit, several DRAM circuits in a DIMM module, and potentially several DIMM modules, the operation of the SoC processors is unlikely to be blocked. Indeed, results from previously requested processing operations by other DRAM processors are likely to be available for collection.

Figure 7:
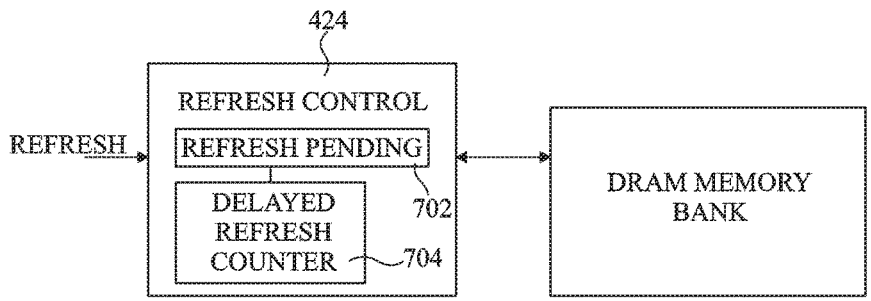
FIG. 7 schematically illustrates a refresh control circuit according to an example embodiment.

FIG. 7 schematically illustrates the refresh control circuit (REFRESH CONTROL) 424 of a DRAM sub-memory in more detail according to an example embodiment.

As mentioned previously, DRAM circuits require periodic refresh operations in order to prevent data loss. For example, certain DRAM technologies may typically require that within a period of 64 microseconds (ms) all of the lines of a memory bank have been refreshed. For example, a refresh control system integrated into a memory controller of the SoC 102 generates periodic refresh transactions, which in some cases may be transmitted as refresh packets grouping a plurality of refresh transactions for a given DRAM circuit.

It should be noted that there is generally a certain tolerance in the refresh periodicity, permitting refresh operations to be delayed, for example by at least a few tens of microseconds. In some cases, it is sufficient that the refresh operation is executed before a subsequent refresh transaction arrives. Furthermore, a refresh operation does not modify the data held by a memory bank.

The refresh control circuit 424 advantageously permits refresh operations to be delayed until the end of a memory bank access by a DRAM processor.

The refresh control circuit 424 receives refresh transactions (REFRESH), and for example comprises a refresh pending register (REFRESH PENDING) 702, and a delayed refresh counter (DELAYED REFRESH COUNTER) 704.

Operation of the refresh control circuit 424 of FIG. 7 will now be described in more detail with reference to FIG. 8.

Figure 8:
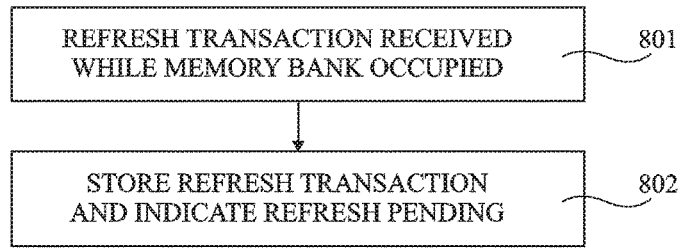
FIG. 8 is a flow diagram illustrating steps in a refresh control method according to an example embodiment.

FIG. 8 is a flow diagram showing operations in a method of processing refresh transactions. This method is for example performed locally by the refresh control circuit 424 of each of the sub-memories 406 to 412 of the DRAM circuit. Initially, it is assumed that a DRAM circuit, such as the circuit DRAM0 of FIG. 4, has received a refresh transaction, that the refresh controller 416 has propagated the refresh transaction to the refresh control circuit 424 of each of the sub-memories 406, 408, 410, 412, and that those refresh control circuits 424 capable of immediately performing the refresh operation do so.

In an operation 801, the refresh control circuit 424 of one of the sub-memories receives a refresh transaction while its memory bank is occupied by a memory bank access by the DRAM processor 420.

In an operation 802, the delayed refresh counter 704 stores the refresh transaction and indicates, for example in the refresh pending register 702, that a refresh transaction is pending. The refresh transaction is for example launched as soon as the current memory bank access is complete. The refresh pending register 702 is for example reset only once the refresh operation has been completed. The refresh pending register 702 is for example accessible by the DRAM processors and also by the SoC processors, and these processors are for example configured not to attempt to access the memory bank until the refresh pending register has been reset. In some embodiments, the status bit of the DRAM processor control interface is for example used to indicate that a processing operation has been completed also indicates to the SoC that there are no more pending refresh transactions.

Figure 9:
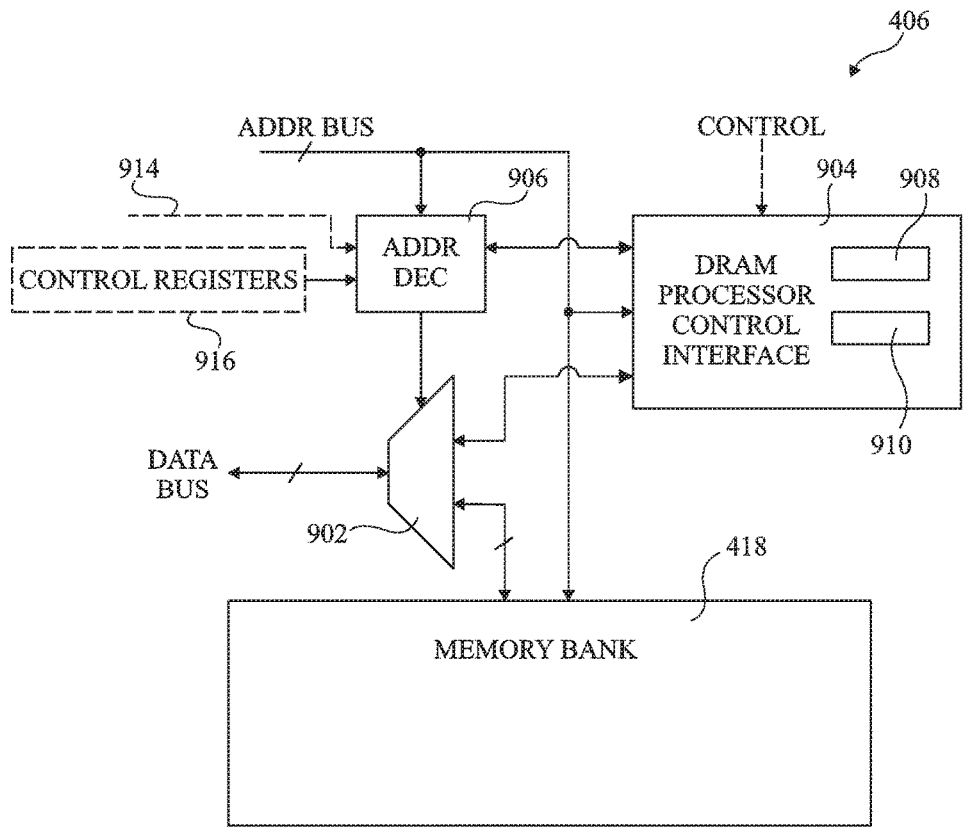
FIG. 9 schematically illustrates part of a DRAM circuit of FIG. 4 in more detail according to a further example embodiment.

FIG. 9 schematically illustrates part of the sub-memory 406 of FIG. 4 in more detail according to an example embodiment.

The memory bank 418 is for example coupled to an address bus (ADDR BUS) and to a data bus (DATA BUS) via a bi-directional multiplexer 902. In particular, the bi-directional multiplexer for example has a pair of input/output ports, one being coupled to the memory bank 418, and the other being coupled to the DRAM processor control interface (DRAM PROCESSOR CONTROL INTERFACE) 904, which for example corresponds to the global interface 415 and/or the local interface 423. A further input/output port of the multiplexer 902 is coupled to the data bus, and can be coupled to either the memory bank 418 or the DRAM processor control interface 904 based on a selection signal provided by an address decoder 906.

The DRAM processor control interface 904 for example comprises one or more control registers 908 and optionally some shared memory 910. The purpose of the shared memory 910 is for example to permit information to be passed to or from the DRAM processor without stopping it. The DRAM processor control interface 904 for example permits at least one or more of the following functions:

to initialize DRAM processors within a given DRAM circuit;
to communicate parameters to the DRAM processors and launch program execution by the DRAM processors;
to read the results and state information concerning the DRAM processors; and
to stop the DRAM processors.

Other functions not listed here may also be implemented using the DRAM processor control interface.

The DRAM processor control interfaces also for example permit operations to be performed by a sub-set of one or more of the DRAM processors of a given DRAM circuit, or globally by all of the DRAM processors of a given DRAM circuit.

The DRAM processor control interface 904 for example forms part of the addressable memory space of the DRAM circuit.

In some embodiments, the addressable memory space of the DRAM circuit is larger than the addressable space in the memory banks of the DRAM circuit in order to permit the address locations of the DRAM processor control interface 904 to be permanently accessible by processors of the SoC. In such a case, the address decoder 906 for example controls the multiplexer 902 to couple the data bus to the interface 904 if the address is in the range of addresses associated with the DRAM processor control interface 904.

Alternatively, in some embodiments the address locations of the DRAM processor control interface 904 are initially visible to the SoC, and are then rendered inaccessible by a specific deactivation command if the DRAM processor control interface 904 is not required, implying for example that the DRAM processor is not to be utilized. For example, in such embodiments, immediately following a reset or power up of the DRAM circuit, a certain range of addresses correspond to the memory space of the DRAM processor control interface 904. However, this address range can be transformed into standard DRAM memory space if the deactivation command is asserted.

In other embodiments, the address locations of the DRAM processor control interface 904 are initially invisible to the SoC, and are then rendered accessible by a specific activation command if the interface is to be used, as will now be described with reference to FIG. 10.

Figure 10:
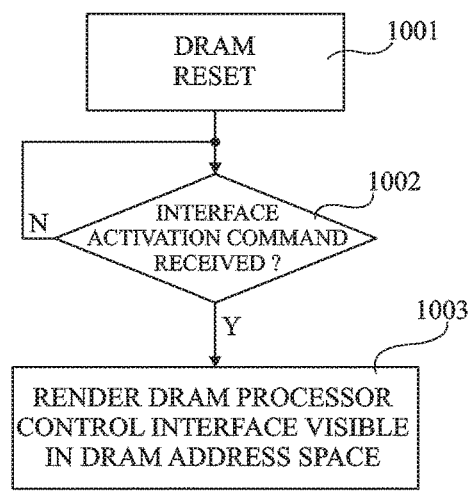
FIG. 10 is a flow diagram illustrating operations in a method of rendering a DRAM processor control interface visible in the DRAM address space according to an example embodiment.

FIG. 10 is a flow diagram illustrating operations in a method of rendering a DRAM processor control interface accessible within the address space of a DRAM circuit.

In an operation 1001, a DRAM reset operation is performed, or the DRAM circuit is powered up. Initially, a certain range of addresses correspond to standard DRAM address space of the DRAM circuit immediately following a reset or power up of the DRAM circuit.

In an operation 1002, it is determined, for example by the DRAM processor control interface 904 and/or the address decoder 906, whether an interface activation command has been received. If such a command is received, the next operation is 1003.

In operation 1003, the DRAM processor control interface is rendered visible within the address space of the DRAM circuit by transforming the range of addresses into the memory space of the DRAM processor control interface 904.

The deactivation or activation command for example corresponds to a signal transmitted from the SoC to the address decoder 906 via a dedicated input pin of the DRAM circuit, as represented by a dashed line 914 in FIG. 9.

Alternatively, the deactivation or activation command for example corresponds to a value held in one or more control registers 916, which are present in certain DRAM circuits for special transactions such as MRS (mode register set) commands. For example, the address decoder 906 controls the multiplexer 902 to couple the data bus to the DRAM processor control interface 904 when the address on the address bus is in an address range defined by the control registers 916. Rather than making use of existing registers present in certain DRAM circuits, one or more new registers could be added, which are for example configured to be accessible using an MRS transaction.

As yet a further alternative, the activation or deactivation signal can be transmitted by the SoC over the standard memory buses of the DRAM circuit, for example using the address bus. For this, the address decoder 906 and/or the DRAM processor control interface 904 is adapted to detect a specific sequence of commands from the SoC that will be referred to herein as a magic sequence. The magic sequence is for example a sequence of commands corresponding to a fictive memory access, in other words one that respects the standard protocol for communicating with the DRAM circuit, but which can be distinguished from a real memory access. It is for example selected to be a command sequence that is very unlikely or impossible to occur under normal operation of the DRAM circuit. Rather that there being a single magic sequence, in some embodiments there may be several, and the address range of the address decoder 906 for example depends on which magic sequence is applied.

In some embodiments, to avoid false positive detections of the magic sequence, the DRAM circuit for example comprises a clock cycle counter, or a refresh counter, which counts the number of clock cycles or refresh transactions that have been received. A sequence is then for example excluded from being considered as the magic sequence if:

it arrives before a first time instant, i.e., before a first number of clock cycles or refresh operations, for example before a boot sequence has been fully completed, meaning that it may have been generated accidentally during boot;

it arrives after a second time instant, i.e., after a second number of clock cycles or refresh operations, for example long after a boot sequence has been completed, whereas the software driver that manages the DRAM processors and may generate the magic sequence is generally activated just after the operating system, and before applications, are loaded;

it takes more than a certain time to occur, i.e., more than a certain number of clock cycles or refresh operations, whereas the actual magic sequence is likely to occur over a relatively compact period of time.

One example of a magic sequence is multiple consecutive accesses by a SoC processor, once the cache memory has already been activated, of a same zone of the memory without any other intermediate accesses to other zones of the memory. In particular, the cache memory is generally activated very early during a boot sequence, as the SoC processors tend to operate slowly until the cache memory has been activated. Once the cache has been activated, it is very unlikely that multiple consecutive accesses occur within a same memory zone.

Another example of a magic sequence is to define certain non-cacheable memory zones, and then to make multiple consecutive accesses to these zones. In particular, modern processors generally include an MMU (memory management unit), which permits an indication that a memory zone is not cacheable. Normally, an application would have no reason to request that a part of the memory is not cacheable, as this would lead to a sharp decrease in performance, without any counter-advantage. If the cache is on, implying that cache is to be used, there is little chance that multiple consecutive accesses will be made to a same DRAM memory zone. Therefore, the magic sequence is for example detected by the presence of multiple memory accesses to a given DRAM memory zone.

As yet a further example of a magic sequence, the fact the memory is cacheable in write through may be used, as will now be described in more detail.

When a memory zone is cacheable, a read operation according to a "read allocate" mode of operation involves:

a. verifying whether the target zone of the read operation is already in cache;

b. (i) if the target zone is already in cache, the cache line is read, and the read operation is complete;

b. (ii) if the target zone is not already in cache, the target zone is loaded into cache, this cache line is then read, and the read operation is complete.

A write operation may be performed using one of two modes, a "write allocate" mode, or a "write through" mode.

A write operation according to the write allocate mode involves:

a. verifying whether the target zone of the write operation is already in cache;

b. (i) if the target zone is already in cache, the corresponding cache line is written, and the write operation is complete;

b. (ii) if the target zone is not already in cache, the target zone is loaded into a cache line, the cache line is written, and then the write operation is complete;

c. the data is written from the cache to the main memory when the cache line is to be removed from the cache and used to update the main memory.

A write operation according to the write through mode involves:

a. verifying whether the target zone of the write operation is already in cache;

b. if the target zone is already in cache, the corresponding cache line is written;

c. whether or not the target zone is already in cache, the data is also written to the main memory.

The write through mode may use burst write transactions in which some words of the transaction are not written because the burst length is longer than the data to be written. The write allocate mode on the other hand only uses burst write transactions in which all of the words of the transaction are written.

A processor of the SoC is for example capable of specifying, via the MMU, whether access to each page of memory is to be:
1) cacheable; or
2) cacheable using read allocate and write allocate, which is generally referred to as a "write allocate" mode; or
3) cacheable using read allocate and write through, which is generally referred to as a "write through" mode.

Of these modes, it is generally the write allocate mode that provides the best performance. The write through mode is however used in certain hardware configurations, for example if a frame buffer is present, this frame buffer being read by a display processor not having the capacity to perform bus snooping, and therefore not being able to retrieve the data to be read from the cache of a processor.

In modern SoC, the processors, are capable of using bus snooping in order to retrieve the data to be read in the cache of another processor. Therefore, there is generally no need to use the write through mode.

Therefore, the magic sequence may correspond to an access made using the write through mode, detectable by the fact that a burst access is performed in which certain words are not written. For example, the write enable signal is negated for at least one data value.

A further example of a magic sequence is a series of memory accesses using abnormal special and temporal access localities. In particular, when cache is used, repeated accesses to the same memory addresses are performed using the cache instead of the memory bank of the DRAM circuit. Therefore, repeated accesses within a relatively small zone of a memory bank, for example within several words, and within a relatively short time period, for example several hundred microseconds, can be recognised as an improbable event interpreted as the magic sequence.

An advantage of the embodiments described herein is that a DRAM circuit having an internal processor may operate in accordance with a DDR protocol, while at the same time permitting a performance improvement by reducing to some extent data transfer operations between the DRAM circuit and the SoC. Furthermore, by implementing the processor control interface as a set of control registers accessible within an address space of the memory circuit, the interface can be implemented without dedicated hardware in the central processor. Such a solution can thus be applied to an existing design of a central processing device without requiring changes to the hardware. In particular, the interface is for example implemented in software executed by the central processor, the software implementing an access exclusion protocol preventing the central processor from accessing one or more banks of the memory array while the internal processor is performing an operation. The central processor is for example capable of knowing when operations are being performed by the internal processor, because the central processor is responsible for directing processing commands to the internal processor, and can access, via the processor control interface, data indicating when the internal processor has finished an operation. Thus the access exclusion protocol prevents simultaneous access attempts from the central and internal processors, thereby avoiding the need for collision arbitration between these processors.

An advantage of providing a mechanism for delaying refresh operations within the memory circuit is that refresh operations may be generated in a standard fashion by the central processor, for example by a memory controller of the central processor. Therefore, the memory controller need not be aware of what operations are in the process of being executed by the internal processor of the memory circuit.

Having thus described at least one illustrative embodiment, various alterations, modifications and improvements will readily occur to those skilled in the art.

For example, it will be apparent to those skilled in the art that while embodiments have been described in which there is one DRAM processor control interface per DRAM processor, in some embodiments one such interface could be shared between several processors.

Furthermore, it will be apparent to those skilled in the art that the various features described in relation to the various embodiments could be combined, in alternative embodiments, in any combination.

The invention claimed is:

1. A memory circuit comprising:
a memory array comprising one or more memory banks;
a first processor; and
a processor control interface for receiving data processing commands directed to the first processor from a central processor, wherein the processor control interface includes a set of control registers accessible within an address space of the memory circuit and wherein the processor control interface is configured to indicate through the control registers to the central processor when the first processor has finished accessing one or more of the memory banks of the memory array, these memory banks becoming accessible to the central processor, and wherein the processor control interface does not comprise any dedicated control line for collision arbitration between the first processor and the central processor;
wherein the memory circuit is a dynamic random access memory circuit further comprising a refresh control circuit configured:
to receive, from the central processor, refresh transactions for performing data refresh operations in at least one memory bank of the memory array;
to determine whether the at least one memory bank is being accessed by the first processor, and if so, to delay a start time of the data refresh operation.

2. The memory circuit of claim 1, wherein the refresh control circuit comprises a refresh pending register, and wherein delaying a start time of the data refresh operation comprising indicating in the refresh pending register that the refresh operation is pending.

3. The memory circuit of claim 1, wherein the address space of the memory circuit comprises one or more addresses permanently associated with the set of control registers.

4. The memory circuit of claim 1, wherein the address space of the memory circuit comprises one or more addresses associated with the set of control registers, and wherein said one or more addresses are configured to be transformed to addresses of the memory array upon assertion of a register deactivation control signal.

5. The memory circuit of claim 1, wherein the processor control interface is configured to receive an activation signal from the central processor for rendering the set of control registers accessible within the address space of the memory circuit.

6. The memory circuit of claim 5, wherein the activation signal is provided via an address bus, and is detectable by the processor control interface.

7. The memory circuit of claim 6, wherein the memory access sequence for rendering the set of control registers accessible is a burst access sequence in which not all of the words are written.

8. The memory circuit of claim 6, wherein the memory access sequence for rendering the set of control registers accessible is a plurality of memory accesses to memory cells within a memory zone in one of said memory banks within a first time period.

9. The memory circuit of claim 6, wherein the memory circuit is configured to detect the memory access sequence based on one or more of:
   a time period in which the memory access sequence is received; and
   a time duration of the memory access sequence.

10. A system comprising:
    a plurality of memory circuits of claim 1; and
    a central processor coupled to each of the memory circuits via a common N-bit data bus, each memory circuit comprising an N-bit bus interface coupled to the N-bit data bus.

11. A method of accessing a memory circuit comprising
    a memory array having one or more memory banks;
    a first processor; and
    a processor control interface comprising a set of control registers accessible within an address space of the memory circuit, the method comprising:
    receiving, by the processor control interface, data processing commands directed to the first processor from a central processor;
    indicating, by one of the control registers of the processor control interface (904) to the central processor, and without using any dedicated control line for collision arbitration between the first processor and the central processor, when the first processor has finished accessing one or more of the memory banks of the memory array, these memory banks becoming accessible to the central processor;
    wherein the memory circuit is a dynamic random access memory circuit, the method further comprising:
      receiving, by a refresh control circuit, a refresh transaction for performing a data refresh operation in a memory bank of the memory array;
      determining, by the refresh control circuit, whether the memory bank is being accessed by the first processor, and if so, delaying a start time of the data refresh operation.

12. The method of claim 11, further comprising:
    receiving by the processor control interface an activation signal from the central processor for rendering the set of control registers accessible within an address space of the memory circuit.

* * * * *